(12) United States Patent
Chung et al.

(10) Patent No.: US 8,582,016 B2
(45) Date of Patent: Nov. 12, 2013

(54) PHOTOGRAPHING APPARATUS AND FOCUS DETECTING METHOD USING THE SAME

(75) Inventors: Chong-Sam Chung, Seongnam-Si (KR);
Jin-Won Lee, Seongnam-Si (KR);
Kyoung-Hwan Moon, Yongin-Si (KR);
Sung-Hyun Kim, Yongin-Si (KR)

(73) Assignee: Samsung Electronics Co., Ltd (KR)

( * ) Notice: Subject to any disclaimer, the term of this patent is extended or adjusted under 35 U.S.C. 154(b) by 583 days.

(21) Appl. No.: 12/622,005

(22) Filed: Nov. 19, 2009

(65) Prior Publication Data
US 2010/0182488 A1  Jul. 22, 2010

(30) Foreign Application Priority Data
Jan. 21, 2009 (KR) .................. 10-2009-0005161

(51) Int. Cl.
*G03B 13/00* (2006.01)
*H04N 5/232* (2006.01)

(52) U.S. Cl.
USPC ............ 348/345; 348/335; 348/349; 348/351

(58) Field of Classification Search
USPC .................. 348/345, 335, 349, 351
See application file for complete search history.

(56) References Cited

U.S. PATENT DOCUMENTS

| | | | |
|---|---|---|---|
| 4,370,551 A * | 1/1983 | Fukuhara et al. .......... 250/201.8 |
| 5,579,171 A | 11/1996 | Suzuki et al. |
| 5,678,071 A | 10/1997 | Ohtake |
| 5,999,746 A | 12/1999 | Kitagawa |
| 2002/0097324 A1 | 7/2002 | Onuki |
| 2005/0276590 A1* | 12/2005 | Ishikawa et al. ................ 396/55 |
| 2008/0055457 A1 | 3/2008 | Nakahara |
| 2009/0128638 A1* | 5/2009 | Okada ........................ 348/208.2 |

* cited by examiner

*Primary Examiner* — Antoinette Spinks
(74) *Attorney, Agent, or Firm* — The Farrell Law Firm, P.C.

(57) ABSTRACT

A photographing apparatus capable of automatic detection of a focus of a subject and a method thereof are disclosed. The photographing apparatus includes a control unit for detecting the focus of the subject using images of the subject acquired with a moveable lens being in different positions so as to allow the detection of the focus of the subject automatically and nearly simultaneously with the photographing the subject without using a separate AF module that requires light separation and/or separate dedicated focus image sensor.

18 Claims, 7 Drawing Sheets

PHOTOGRAPHING APPARATUS AND FOCUS DETECTING METHOD USING THE SAME

CROSS-REFERENCE TO RELATED APPLICATIONS

This application claims the benefit of Korean Patent Application No. 10-2009-0005161, filed in the Korean Intellectual Property Office on Jan. 21, 2009, the disclosure of which is incorporated herein by reference in its entirety.

TECHNICAL FIELD

Apparatuses and methods consistent with the present disclosure relate generally to a photographing apparatus and a method of detecting the state of focus, and, more particularly, to a photographing apparatus for detecting the state of focus automatically and a method of such detection.

BACKGROUND OF RELATED ART

The advent of digital photography, which makes possible the storage of photographic images on various storage media such as, e.g., memory devices and optical and magnetic disks, in combination with the ability to disseminate such images electronically, e.g., over the Internet, has fueled a recent increased popularity of various photographing apparatuses, including digital or film cameras alike. In attempts to capture the increased market attendant with such increased popularity, the manufacturers are offering competing models of photographing apparatuses that attempt to satisfy the ever growing expectations by the consumers for photographing apparatuses that incorporate a growing number of various advanced features of convenience.

One such advanced feature commonly found in modern photographing apparatuses is the auto focusing (AF) feature that automatically adjusts the focusing on the subject being photographed. Such AF function is typically achieved by measuring the relative distance between two separately acquired images of the subject to determine the distance by which the photographing lens is to be moved in order to bring the subject into focus and by moving the photographing lens by the determined distance.

However, for such AF operation, a conventional photographing apparatus includes a separate AF module that may include, for example, a sub mirror arranged to change the path of light and/or a separating lens for dividing the light to generate the two separate images. In such conventional photographing apparatus, because some portion of the light is diverted by the sub mirror for the purposes of the auto focusing, the entire light may not be available for the purpose of acquiring the photographic image by an imaging element, which makes it virtually impossible or undesirable to simultaneously acquire the photographic image and perform the AF function.

A photographing apparatus and/or a method capable of realizing an automatic focusing without the need for the use of a separate AF module are thus desirable.

SUMMARY OF THE DISCLOSURE

According to an aspect of the present disclosure, a photographing apparatus may be provided to include an image pickup unit having an imaging surface and a control unit. The control unit may be configured to cause a movement of at least one lens arranged in the photographing apparatus in a first direction and in a second direction, and may be further configured to determine the state of focus of a subject being photographed based on a first image generated on the imaging surface of the image pickup unit after the at least one lens has moved in the first direction and a second image generated on the imaging surface of the image pickup unit after the at least one lens has moved in the second direction.

The first direction and the second direction may be directions that satisfy at least one condition of: each of the directions being perpendicular to an optical axis of the at least one lens; the directions being opposite from each other; and the directions extend diagonally across with respect to the imaging surface of the image pickup unit.

The control unit may further be configured to cause the at least one lens to move in at least one of the first direction and the second direction to thereby compensate for shaking of the photographing apparatus when such shaking is detected.

The control unit may be configured to determine the state of the focus of the subject based on a phase difference between the first image and the second image.

The photographing apparatus may further comprise a mirror that allows a portion of light received from the at least one lens to pass therethrough while reflecting the remaining portion of the light. The portion of the light that has passed through the mirror may be incident upon the imaging surface of the image pickup unit to thereby form the first image and the second image on the imaging surface of the image pickup unit.

The imaging surface may comprise a plurality of optical sensors configured to generate an electrical signal corresponding to an image of the subject.

The optical system of the photographing apparatus may include a plurality of lens groups. The at least one lens may comprise all lenses belonging to a single lens group from among the plurality of lens groups.

According to another aspect of the present disclosure, a method of determining a focus of a subject may be provided to include the steps of: moving at least one lens in a first direction to a first position and in a second direction to a second position; acquiring a first image formed on an imaging surface when the at least one lens is in the first position and a second image formed on the imaging surface when the at least one lens is in the second position; and determining the focus of the subject based on the first image and the second image.

The first direction and the second direction may be directions that satisfy at least one condition of: each of the directions being perpendicular to an optical axis of the at least one lens; the directions being opposite from each other; and the directions extend diagonally across with respect to the imaging surface.

The method may further comprise moving the at least one lens in at least one of the first and second directions to compensate for shaking movement of an image acquiring apparatus with which an image of the subject is acquired.

The step of determining the focus of the subject may comprise the steps of: determining a phase difference between the first image and the second image; and determining the focus of the subject based on the determined phase difference.

The method may further comprise providing a mirror that allows a portion of light received from the at least one lens to pass therethrough while reflecting the remaining portion of the light. The portion of the light that has passed through the mirror may be incident upon the imaging surface of the image pickup unit to thereby form the first image and the second image on the imaging surface.

According to yet another aspect of the present disclosure, an apparatus for acquiring an image of a subject may be provided to include an imaging surface, an optical system and a controller. The imaging surface may be arranged in an optical path of light received from the subject such that the light received from the subject is incident upon the imaging surface to thereby form an optical image of the subject on the imaging surface. The optical system may have at least first and second optical elements each arranged in the optical path upstream of the imaging surface. The first optical element may be arranged to be moveable in a first direction to a first position and in a second direction to a second position, each of the first and second directions being substantially perpendicular to the optical path such that a first optical image of the subject is formed on a first area of the imaging surface when the first optical element is in the first position, and such that a second optical image of the subject is formed on a second area of the imaging surface different from the first area when the first optical element is in the second position. The controller may be configured to control the optical system to move the second optical element of the optical system along a direction substantially parallel to the optical path by a distance determined based on the first and second optical images of the subject.

The controller may be configured to determine a phase difference between the first and second optical images of the subject, and may be configured to determined the distance by which to move the second optical element based on the determined phase difference.

The controller may further be configured to control the optical system to cause the first optical element to move in at least one of the first and second directions in response to a detection of a shaking of the apparatus for acquiring the image of the subject.

The apparatus may further comprise a data storage device that may be configured to receive data representative of the image of the subject and to store therein the data. The image of the subject may correspond to the optical image of the subject formed on a third area of the imaging surface different at least in part from each of the first and second areas of the imaging surface.

The apparatus may further comprise a mirror arranged in the optical path between the optical system and the imaging surface. The mirror may have a partially reflective surface that allows a portion of light received from the optical system to pass therethrough while reflecting the remaining portion of the light. A substantially undivided whole of the portion of the light passing through the minor may be incident upon the imaging surface to thereby form the optical image of the subject on the imaging surface.

The imaging surface may define a substantially a rectangular shaped surface area. Each of the first and second directions may extend diagonally across with respect to the imaging surface.

BRIEF DESCRIPTION OF THE DRAWINGS

Various features and advantages of the present disclosure will become more apparent by the following detailed description of several embodiments thereof with reference to the attached drawings, of which.

DETAILED DESCRIPTION OF SEVERAL EMBODIMENTS

Reference will now be made in detail to the embodiment, examples of which are illustrated in the accompanying drawings, wherein like reference numerals refer to like elements throughout. While the embodiments are described with detailed construction and elements to assist in a comprehensive understanding of the various applications and advantages of the embodiments, it should be apparent however that the embodiments may be carried out without those specifically detailed particulars. Also, well-known functions or constructions will not be described in detail so as to avoid obscuring the description with unnecessary detail. It should be also noted that in the drawings, the dimensions of the features are not intended to be to true scale and may be exaggerated for the sake of allowing greater understanding.

Figure 1:
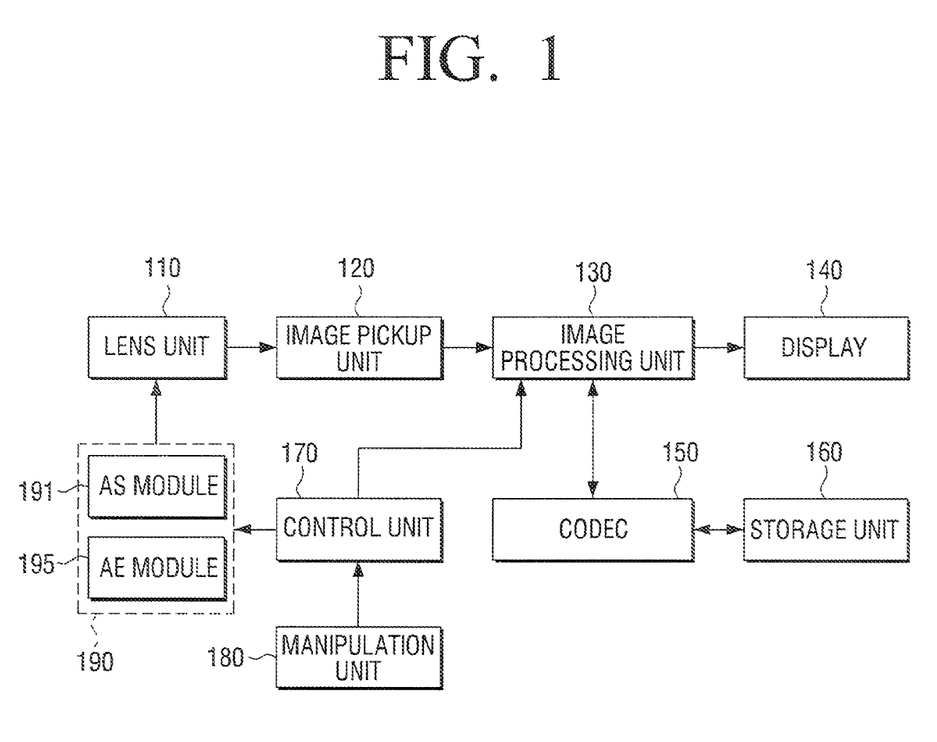
FIG. 1 is a block diagram of a photographing apparatus according to an embodiment of the present disclosure.

FIG. 1 is a block diagram illustrative of a photographing apparatus according to an embodiment of the present disclosure. As illustrated in FIG. 1, the photographing apparatus according to an embodiment may comprise a lens unit 110, an image pickup unit 120, an image processing unit 130, a display 140, a codec 150, a storage unit 160, a control unit 170, a manipulation unit 180 and a driving unit 190.

The lens unit 110 may be arranged to form an image on an imaging area by collecting the light received from a subject. The lens unit 110 may comprises a plurality of lenses, which may be arranged as one or more functional groups.

As will be further described, according to an embodiment of the present disclosure, some lenses in the lens unit 110 may be configured to move perpendicular to the optical axis to compensate for the handshaking and/or to automatically detect the state of focus while other lenses in the lens unit 110 may be configured to move along the optical axis to bring the subject into focus based on the result of the focus detection. The structure and function of the lens unit 110 will be further explained later in greater detail with reference to FIG. 2.

The image pickup unit 120 may photo-electrically transform the optical information received through the lens unit 110 into an electrical signal, and may perform certain signal processing on the electrical signal. For example, the image pickup unit 120 may include a number of picture elements (or pixels) and an AD converter. Each picture element may output an analog image signal, which may be converted by the AD converter into a digital image signal, which may then be provided as the output.

Each picture element of the image pickup unit 120 may be an optical sensor, which may be, for example, a charge-coupled device (CCD) light sensor or a complementary metal oxide semiconductor (CMOS) light sensor. The picture elements of the image pickup unit 120 may read the optical image using a rolling shutter or a global shutter.

The image processing unit 130 may perform signal processing on the image signals received from the image pickup unit 120, and may transmit the processed image signals to the display 140 for a preview display of the image being photographed. The image processing unit 130 may also output the signal-processed image signals to the codec 150 for further processing.

Specific examples of the signal processing that may be performed by the image processing unit 130 may include digital zooming, auto white balance (AWB), format conversion and scale adjustments of the image signal output from the image pickup unit 120.

The display 140 may display the image received from the image processing unit 130, and may thereby allow a user to check the image to be photographed.

The codec 150 may encode the image signal received from the image processing unit 130 into a data format suitable for storage, which may include compression of the image data, and may transmit the encoded image data to the storage unit 160. The codec 150 may also decode the encoded image data stored in the storage unit 160, and may transmit the decoded image signal to the image processing unit 130.

The storage unit 160 may store therein the image photographed through the image pickup unit 120 in compressed form as received from the codec 150. The storage unit 160 may be implemented as any known storage media, which may include, for example, a flash memory, a secure digital (SD) memory, a hard disk, a Digital Versatile Disc (DVD), or the like.

The driving unit 190 may comprise an auto-stabilization (AS) module 190 and an auto-exposure (AE) module, and may drive one or more of the lenses of the lens unit 110.

The AS module 191 may be configured to determine the changes in the angle and/or the straight distance due to shaking, and may compensate the image in order to mitigate the distortion or blurring of the image. To that end, the AS module 191 may be implemented as, for example, an angle sensor, an angular velocity sensor, an angular acceleration sensor, a location sensor, a speed sensor, an acceleration sensor, or the like.

The AS module 191 may move some of the lenses in the lens unit 110 in certain direction in order to compensate for shaking of user's hand. For instance, if a shaking movement is detected in a direction x, the AS module 191 may move some of the lenses in the lens unit 110 in the opposite direction −x to mitigate the image distortion.

According to an embodiment of the present disclosure, the AS module 191 may be configured to move some of the lenses in the lens unit 110 in a direction perpendicular to the optical axis, in addition or in lieu of the above described shaking compensating movement of the lens(es), for the purposes of generating the two images to be used in the detection of the state of focus. For instance, if the optical axis is towards the direction z, the AS module 191 may move the lenses in the first direction along an x-y plane, and then may move the lenses in the second direction opposite the first direction. Further description regarding such movements of the lenses will be provided later in greater detail.

The AS module 191 may further be configured to move some of the lenses of the lens unit 110 parallel to the optical axis in order to bring the image into focus. For instance, assuming the optical axis is along the direction z, the AS module 191 may move the lenses in the +z or −z direction so as to bring the subject image into focus.

The AS module 191 may be implemented using, for example, a voice coil module (VCM), which is capable of moving the coil backward and forward according to the direction of current flow into the coil in relation to a permanent magnet, or an ultrasonic motor.

The AE module 195 may adjust the brightness of the image being photographed by adjusting an iris formed along the optical path in the lens unit 110.

The iris may be used to adjust the amount of light that passes through the lens unit 110, and may also affect the depth of field of the image. That is, if the iris is widened, larger amount of light is allowed to pass through the lens unit 110, thus resulting in a brighter image. However, the widening of the iris results in the widening of the aperture, which in turn results in the reduction in the depth of field of the image. On the other hand, if the iris is narrowed, a smaller amount of light passes through the lens unit 110, resulting in a darker picture. However, the narrower iris opening results in a narrower aperture and thus in a greater depth of field.

The manipulation unit 180 may be configured to receive user commands for various operations of the photographing apparatus, and may transmit the commands received from the user to the control unit 170.

The control unit 170 may control the operations of the photographing apparatus based on the user command received through the manipulation unit 180.

In particular, in order to detect the state of focus automatically, the control unit 170 may send a driving signal to the AS module 191 for moving some of the lenses of the lens unit 110 perpendicular to the optical axis. The control unit 170 may also send a driving signal to the AS module 191 for moving some of the lenses of the lens unit 110 based on the result of shaking movement detection.

That is, the control unit 170 may generate the driving signal that causes the AS module 191 to move some of the lenses in the first and second directions for auto focus detection, and may generate the driving signal that causes the movement of some of the lenses in compensation for the detected shaking movement.

The control unit 170 may obtain an image of the subject with some of the lenses moved in the first direction and again with the lenses moved in the second direction, and may determine the focus state of the subject using, e.g., the phase difference detection method, which is well known to those skilled in the art.

The first and second directions of movement of the lenses may be perpendicular to the optical axis, and may be opposite to each other. According to an embodiment, if an imaging surface on which the light passing through the image pickup unit 120 forms an image is substantially rectangular, the first and second directions may each be a diagonal direction with respect to such imaging surface.

Figure 2:
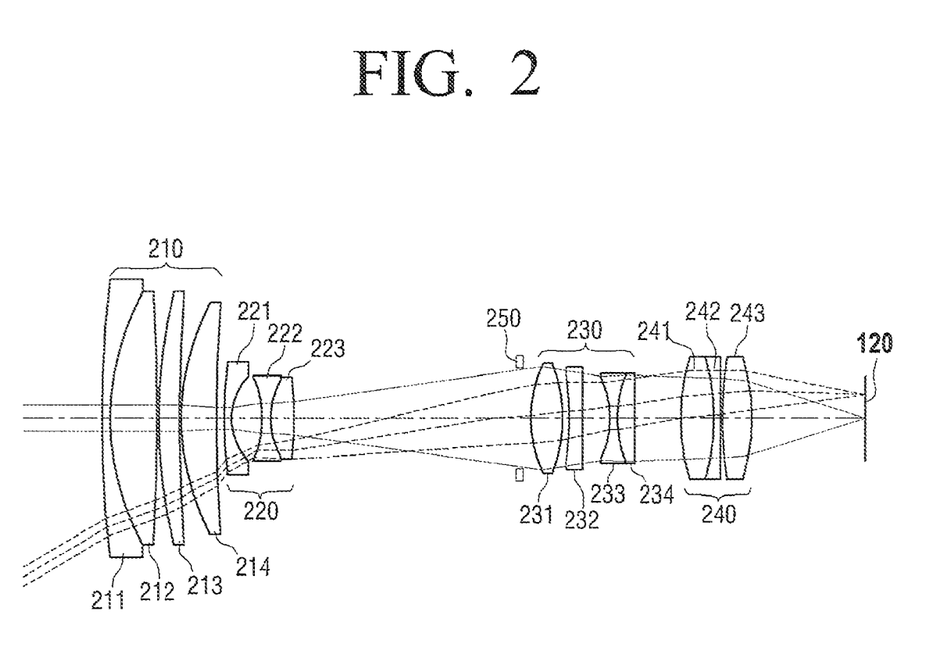
FIG. 2 is a schematic view illustrating a lens unit according to an embodiment of the present disclosure.

The lens unit 110 will now be explained in greater detail with reference to FIG. 2. It should be noted that the specific configurations and arrangements of various optical elements of the lens unit 110 are provided only as an example for the purposes of illustration, and that the number, shapes, configurations and the arrangement of the optical elements can vary depending on the specific design and/or the intended application. As illustrated in FIG. 2, the lens unit 110 according to an embodiment may comprise a first lens group 210, a second lens group 220, a third lens group 230, a fourth lens group 240 and an iris 250.

The first lens group 210 may receive therethrough an optical information of the subject being photographed, and may thus be referred to as the front lens group. The front lens group according to an embodiment may comprise a first lens 211 having a negative optical or refractive power and the second to fourth lens 212, 213 and 214 each having a positive optical power.

The first lens group 210 may contribute to the reduction of the overall length of the lens unit 110 by converging the light received from the subject. Generally speaking, a first lens group 210 of a larger size allows a greater amount of light to pass therethrough, the larger the first lens group 210, the higher is the quality, and the wider is the range, of the image that can be obtained using such first lens group.

The second lens group 220 may adjust the magnification of the image formed by the first lens group 210, and may be referred to as a variator lens group. The second lens group 220 may comprise a fifth lens 221 and a sixth lens 222 each having a negative optical power and a seventh lens 223 having a positive optical power.

The second lens group 220 adjusts the magnification of the image by adjusting the relative positions of the fifth lens 221 to the seventh lens 223. That is, the second lens group 220 may perform a zoom function.

The third lens group 230 may perform an aberration compensation on the image that has passed through the iris 250, and may allow the aberration compensated image pass therethrough to the fourth lens group 240, and may be referred to as a relay lens group.

The third lens group 230 may be divided into a compensation group and a transfer group. The compensation group may comprise an eighth lens 231 having a positive refractive power and a ninth lens 232 having a negative refractive power. The combined refractive power of the eighth and ninth lenses 231 and 232 becomes positive. The compensation group compensates aberration occurring during the passage of the light through the first lens group 210 to the second lens group 220.

The transfer group may be implemented so that a tenth lens 233 having a negative refractive power is connected to an eleventh lens 234 having a positive refractive power. The combined refractive power of the tenth lens 233 and the eleventh lens 234 in the transfer group is a negative power. The transfer group allows the light to pass therethrough to the fourth lens group 240.

The fourth lens group 240 may focus the light received through the third lens group 230 on imaging area of the image pickup unit 120, and may be referred to as a focusing lens unit. The fourth lens group 240 may comprise a twelfth lens 241 having a positive refractive power, a thirteenth lens 242 having a negative refractive power and a fourteenth lens 243 having a positive refractive power.

The fourth lens group 240 may form an image on the image pickup unit 120 by focusing the light on the imaging area of the image pickup unit 120.

The iris 250 adjusts the amount of light that is allowed pass through the lens unit 110. That is, if the iris 250 is open wider, a larger amount of light passes through the lens unit 110, allowing the resulting photographic image to be brighter, but with a smaller depth of field. On the other hand, if the iris opening is narrower, a smaller amount of light passes through the lens unit 110, resulting in a darker photographic image with a greater field of depth.

Figure 3A:
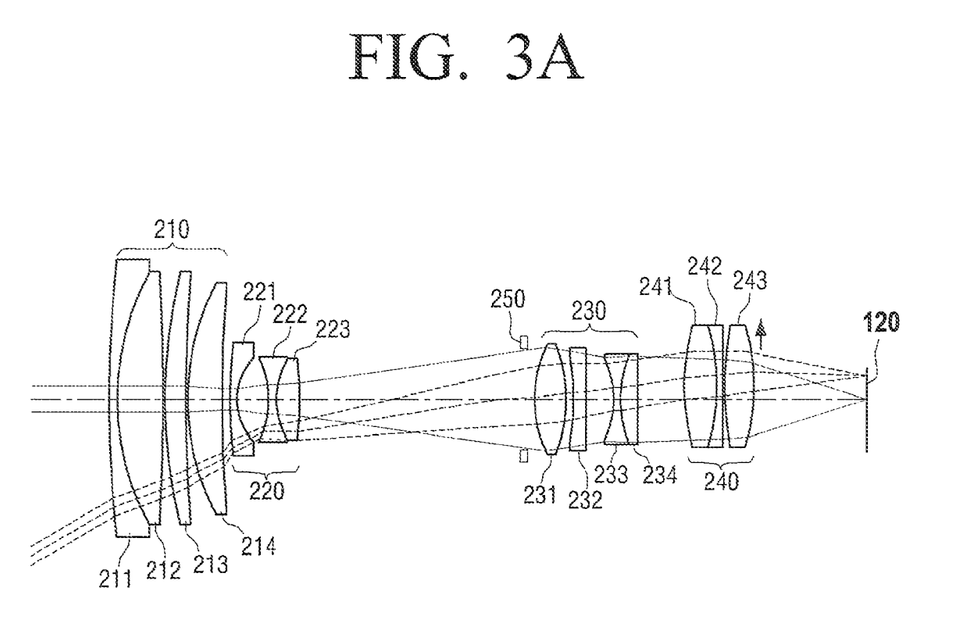
FIGS. 3A and 3B are schematic views illustrating the driving operations of the lens unit for an automatic focus detection according to an embodiment of the present disclosure.
Figure 3B:
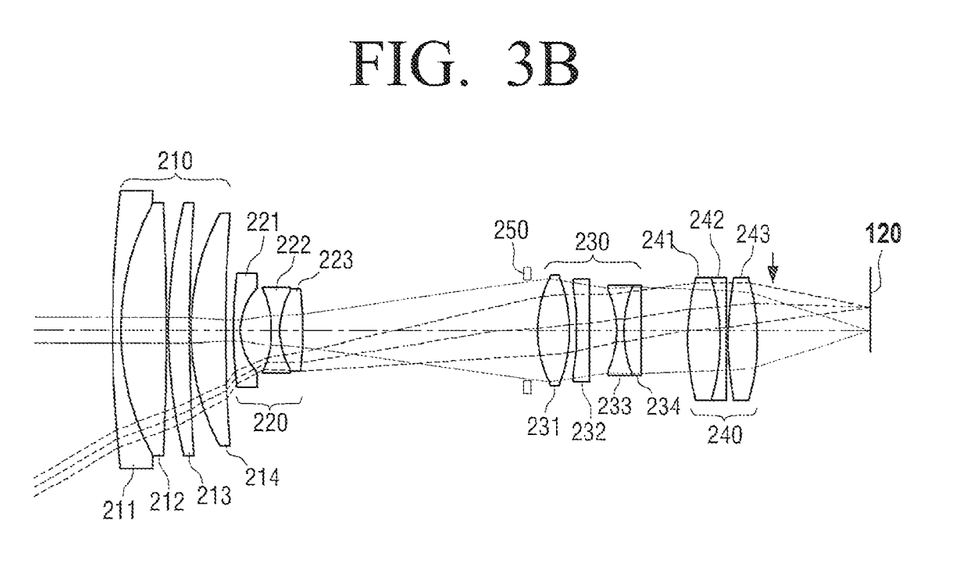

The process of driving the lens unit for the automatic detection of the focus status according to an embodiment of the present disclosure will now be described with reference to FIG. 3A and FIG. 3B.

According to an embodiment, in order to detect the state of focus automatically, the control unit 170 may generate and transmit a driving signal to the AS module 191 to cause the lenses in the fourth lens group 240 to move in a direction perpendicular to the optical axis, for example, in the upward direction, by a predetermined distance. The AS module 191 moves the lenses in the fourth lens group 240 based on the driving signal received from the control unit 170. As illustrated in FIG. 3A, when the lenses in the fourth lens group 240 are in the upwardly moved position, an image of the subject being photographed may be formed in the upper portion on the imaging area of the image pickup unit 120 as compared to the position of the image on the imaging area prior to the upward movement of the lenses of the fourth lens group 240.

The control unit 170 may subsequently generate and transmit a driving signal to the AS module 191 to cause the lenses in the fourth lens group to move perpendicular to the optical axis in an opposite direction, i.e., in this example, the downward direction, by a predetermined distance. The AS module 191 moves the lenses in the fourth lens group 240 based on the driving signal received from the control unit 170. As illustrated in FIG. 3B, when the lenses in the fourth lens group 240 are in the downwardly moved position, an image of the subject being photographed may be formed in the lower portion on the imaging area of the image pickup unit 120 as compared to the position of the image on the imaging area prior to the upward or downward movements of the lenses of the fourth lens group 240.

Figure 4:
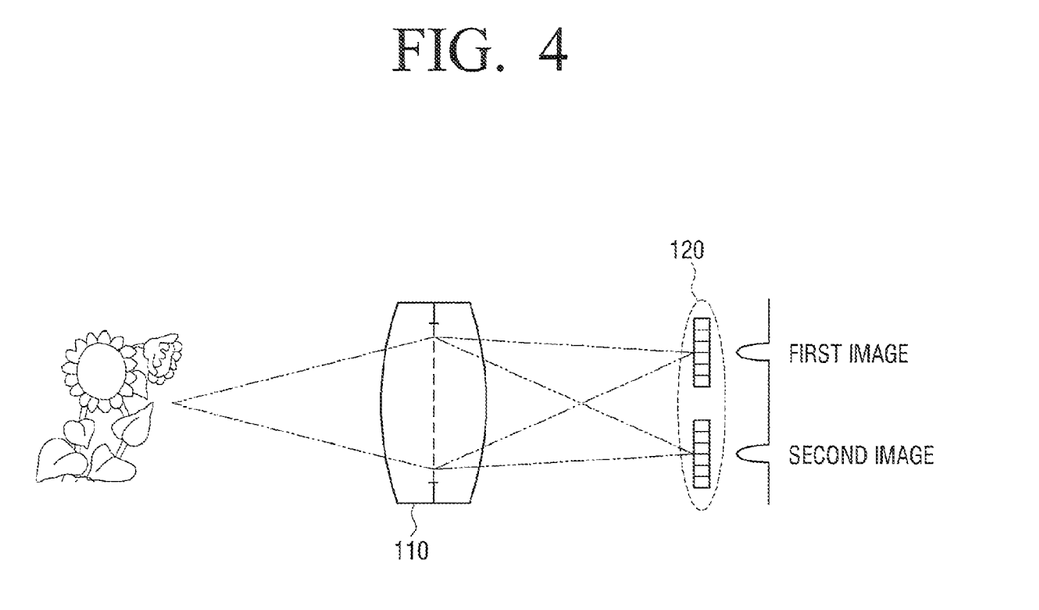
FIG. 4 is a schematic view illustrating the formation of two images according to an embodiment of the present disclosure.

Such formation of the two images of the subject will now be described in greater detail with reference to FIG. 4. As illustrated in FIG. 4, if the lens unit 110 (i.e., the lenses in the fourth lens group 240) moves in the first and second directions each perpendicular to the optical axis, a first image of the subject may be formed on the image pickup unit 120 when the lens unit 110 is in position of having moved in the first direction while a second image may be formed on the image pickup unit 120 when the lens unit 110 is in the position having moved in the second direction. That is, the first image of the subject may be formed on first ones of the plurality of light sensors in the image pickup unit 120 when the lens unit 110 has moved in the first direction while the second image of the subject may be formed on second ones different from the first ones of the plurality of light sensors the lens unit 110 has moved in the second direction.

The image pickup unit 120 may perform sampling of the two light images on the light sensor, convert the sampled result into electrical signal, perform an analog-to-digital (A/D) conversion of the signal, and may output the resulting signal as the image signal. The control unit 170 may determine the state of the focus of the subject by, for example, a phase difference detection method known in the art, using the phase difference between the two images based on the image signal received from the image pickup unit 120.

Accordingly, it is possible to obtain two images of the subject formed on the image pickup unit 120 by moving the lens unit 110 in directions perpendicular to the optical axis without requiring the use of separate component(s) such as, e.g., a separating lens that divert or divide the optical signal received through the lens unit 110.

That is, with the two images formed on the imaging area of the image pickup unit 120, the control unit 170 may determine the focus of the subject following a phase difference detection of the two images, and may provide a driving signal, according to so determined focus state, to the AS module 191, which may, responsive to the received driving signal, move the second lens group 220 along the direction of the optical axis so that the subject may be brought into focus.

While FIGS. 2, 3A, 3B and 4 depict the lens unit 110 being moved up and down, it should be understood that such up/down movements of the lens unit 110 are provided only as illustrative examples of directions perpendicular to the optical axis, and that the lens unit 110 may be moved in other directions that are perpendicular to the optical axis.

Figure 5A:
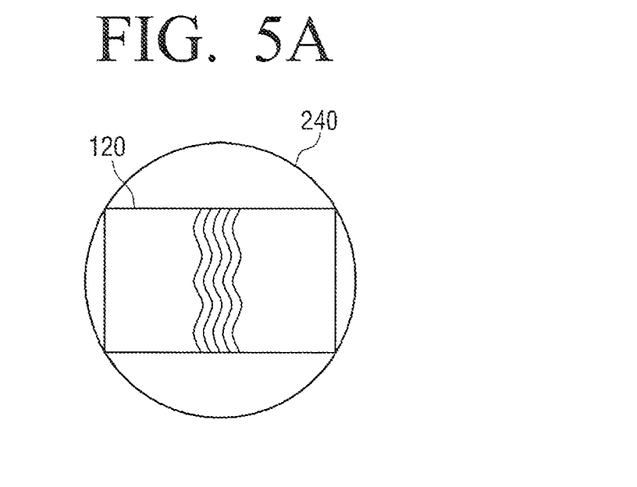
FIGS. 5A-5C illustrate the diagonal movement of the lens unit according to an embodiment of the present disclosure.
Figure 5B:
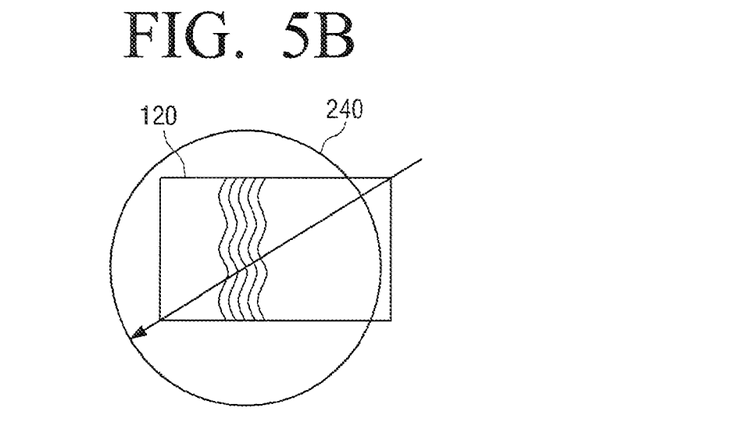
Figure 5C:
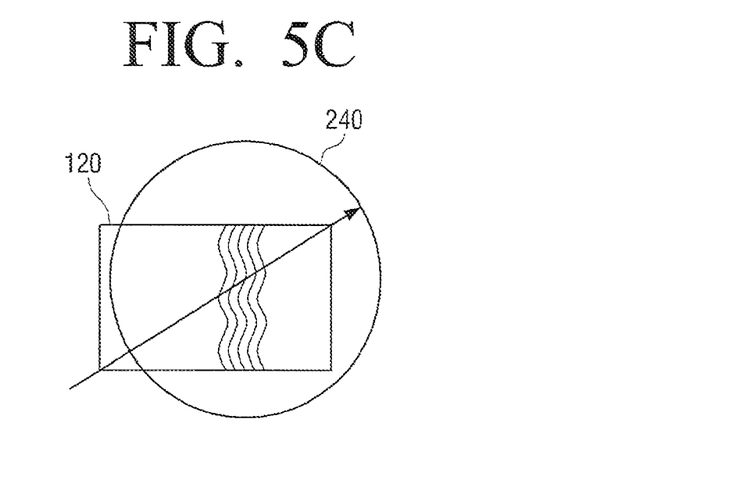

For example, in FIG. 5A to 5C, the movement of the lens unit diagonally with respect to the imaging surface of the image pickup unit 120 according to an alternative embodiment of the present disclosure is illustrated. As illustrated in FIG. 5A, if a subject formed on the imaging surface has a certain pattern along the vertical direction, it may be difficult to detect the phase difference between two generated images using up and down movement of the lens unit 110. That is, since there may not be a significant distinguishable feature in the first and second images respectively formed with the lens unit 110 in the upward and downward positions, it may be difficult to determine the phase difference between the first and second images, and it may thus be difficult to determine the focus state based on the same.

Similar difficulties may present themselves when the subject has a certain pattern along the horizontal direction. In general, a subject may more likely than not have a certain repeating pattern of features in the horizontal or in the vertical direction. For photographing of such subjects, it may be difficult to detect the focus of the subject by moving the lens unit 110 up and down or right and left with respect to the optical axis. Accordingly, if the lens unit 110 is moved in a diagonal direction, specifically, diagonally across with respect to the imaging surface as illustrated in FIG. 5B and FIG. 5C, it may becomes easier to determine the focus state of the subject that includes a certain pattern along the horizontal or the vertical direction.

To that end, according to an embodiment, the control unit 170 may generate and send a driving signal to the AS module 191 for moving the lens unit diagonally with respect to the imaging surface. The AS module 191 may in response to the receive the driving signal move the lens unit 110 in the diagonal direction of the imaging surface.

Figure 6:
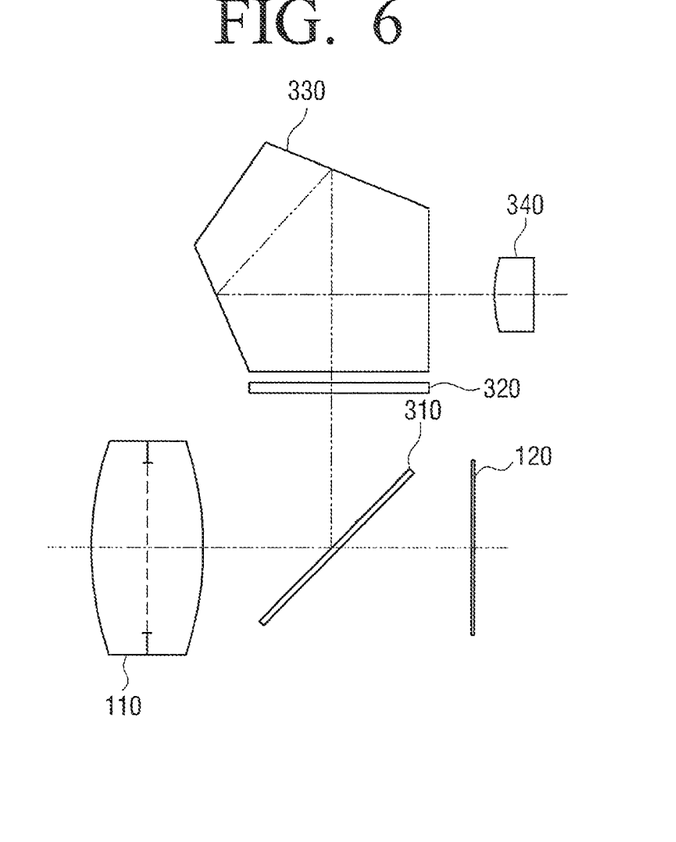
FIG. 6 is a schematic view illustrating the relevant portions of a DSLR camera according to an embodiment of the present disclosure.

According to an embodiment, the photographing apparatus described above may be implemented as a digital single lens reflex (DSLR) camera. For example, FIG. 6 illustrates an example of the relevant structure of a such DSLR camera. Referring to FIG. 6, a DSLR camera according to an embodiment may comprise the lens unit 110, the image pickup unit 120, a mirror 310, a focusing screen 320, a penta prism 330 and an eyepiece lens 340. Since the lens unit 110 and the image pickup unit 120 were previously described, a repeated descriptions thereof are unnecessary, and will thus be omitted.

The mirror 310 may be partially reflective, thus allowing some of the light received from the lens unit 110 while reflecting the remainder of the light. Specifically, the mirror 310 may reflect some of the light that has passed through the lens unit 110 to the focusing screen 320 to thereby allow a user to see an image of the subject via the eyepiece lens 340. The unreflected remainder of the light is allowed to proceed through the mirror 310, and may be used for the purposes of focusing on the subject.

Accordingly, it may be possible for a user to operate the automatic focusing of and view an image of the subject through the view finder simultaneously while requiring the use of only a single mirror 310 to do so. That is, by using the light from the lens unit 110 that has passed through the mirror 310, the automatic focusing and photographing of the subject can be performed at the same time. In addition, the user may be allowed a direct view the subject via the view finder using the light from the lens unit 110 that is reflected off the mirror 310.

According to an embodiment, a through-the-lens (TTL) metering function may also be implemented via the mirror 310. In some embodiments, such TTL metering functions may be performed at the view finder, and may include measuring lights, metering distance, or both.

Specifically, a TTL view finder is a view finder, which reflects light from the lens unit 110 so that the user can view an image to be photographed via the view finder, and which performs the TTL metering function(s) as well. A TTL light-measuring refers to the metering of the brightness of the image to be photographed using light from the lens unit 110. That is, the result of the TTL light metering may be used for the auto exposure function, which was previously described above, and/or adjusting the level of light intensity of the flash light. The TTL distance-metering refers to the adjusting of the focus of the subject using the lights from the lens unit 110. That is, the TTL distance-metering may be used for the auto focusing described herein.

Referring again to FIG. 6, the focusing screen 320 may comprise a mat surface and a fresnel lens. The mat surface may be disposed at a location optically equivalent to the imaging surface with respect to the image being photographed. Accordingly, an image which is substantially the same as the photographed image may be formed on the mat surface. The fresnel lens gathers the light passing through the mat surface so as to allow a user to view a brighter image via the eyepiece lens 340.

The penta prism 330 is a prism having a pentagonal shape, and may convert the vertically or laterally inversed (i.e., upside-down or left-right inversed) image that is formed on the focusing screen 320 into a normal upright image so that an image that is in the same proper orientation as the actual subject may be viewed through the view finder.

The eyepiece lens 340 may create a virtual image, e.g., at one meter in front thereof, so that the user may view the image of the subject properly framed. Accordingly, the user may be able to check the image to be photographed via the eyepiece lens 340.

Therefore, the focusing on, and the photographing of the subject, may be accomplished at the same time. According to an embodiment, the photographing apparatus described herein may be implemented as a digital single lens reflex (DSLR) camera.

Figure 7:
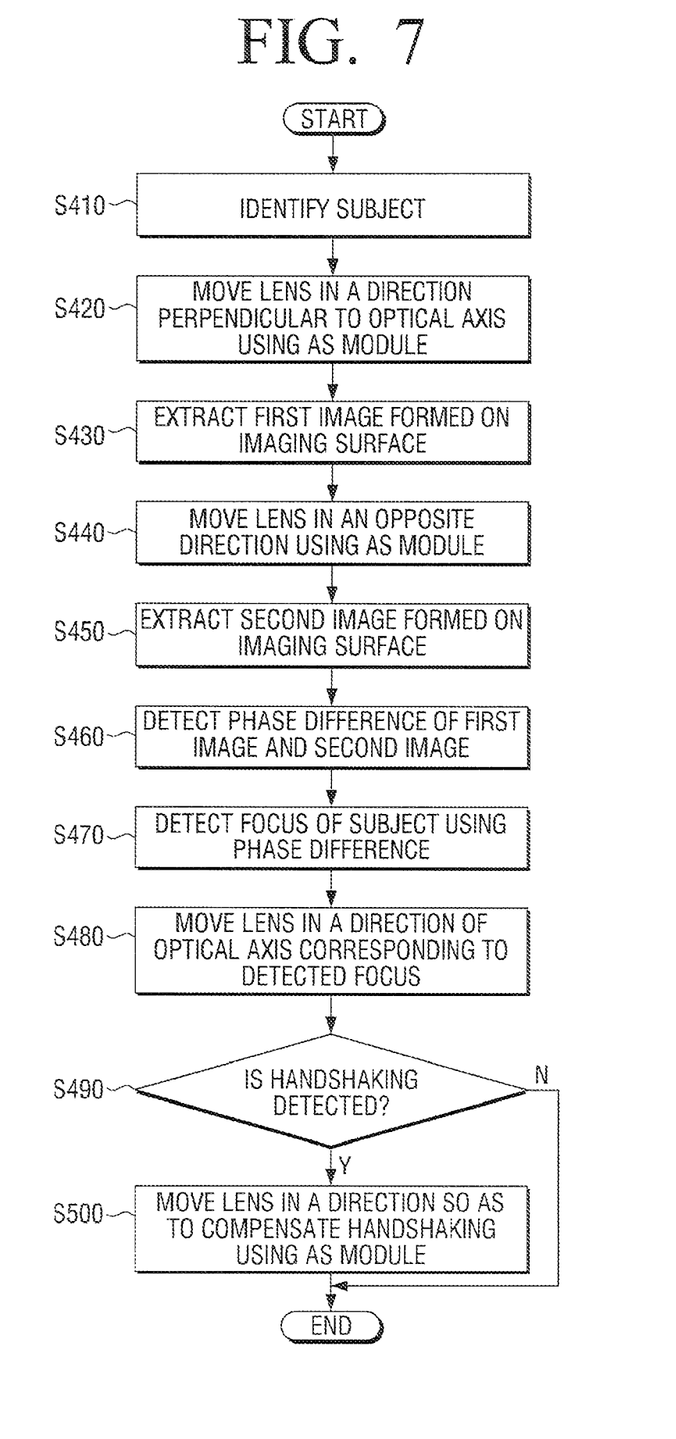
FIG. 7 is a flow chart of a method of focus detection according to an embodiment of the present disclosure.

A method of automatic focus detection according to an embodiment of the present disclosure will now be described with reference to the flow chart thereof shown in FIG. 7. According to an embodiment, the focus detection and the hand shaking compensation can be performed using the AS module 191.

If the photographing apparatus identifies a subject (S410), the control unit 170 may move the fourth lens group 240 in a direction perpendicular to the optical axis using the AS module 191 (S420). More specifically, the control unit 170 may provide a driving signal to the AS module 191. The AS module 191 may receive the driving signal, and in response thereto may move the fourth lens group 240 in the first direction perpendicular to the optical axis.

The control unit 170 may obtain a first image of the subject formed on the imaging surface after the fourth lens group 240 has moved in the first direction by a predetermined distance (S430).

The control unit 170 may subsequently move the fourth lens group 240 in a second direction perpendicular to the optical axis but opposite to the previous first direction using the AS module 191 (S440). More specifically, the control unit 170 may provide a driving signal to the AS module 191. The AS module 191 may receive the driving signal, and in response thereto may move the fourth lens group 240 in the second direction perpendicular to the optical axis.

The control unit 170 obtain a second image of the subject formed on the imaging surface after the fourth lens group 240 has moved in the second direction by a predetermined distance (S450). The control unit 170 may then determine the phase difference between the first and second images (S460), and, based on the determined phase difference, determines the state of focus of the lens unit 110 on the subject (S470). Such phase difference based focus detection is often referred to as a phase difference detection method, and is well known to those skilled in the art.

To complete the auto focusing operation, the control unit 170 may if necessary move the second lens group 220 of the lens unit 110 along the direction of the optical axis using the AS module 191 by a distance that is determined according to the determined focus state so that the subject is brought into focus (S480). More specifically, the control unit produce and transmit a driving signal to the AS module 191, which responsive to the driving signal moves the second lens group 220 along the optical axis.

According to an embodiment, the control unit 170 may also control the hand shaking compensation function. To that end, the control unit 170 may determine if a shaking movement is detected in the photographing apparatus (S490). If it is determined that shaking of the hand is detected (S490: Y), the control unit 170 may move the lens in a direction so as to compensate the shaking movement using the AS module 191, which may be the same module used in the automatic focus detection described above (S500). More specifically, the control unit 170 sends a driving signal instructing the AS module 191 to move the fourth lens group 240 in a direction so as to compensate for the shaking. The AS module 191 may, in response to the received driving signal, move the fourth lens group 240 in the direction according to the driving signal.

While a detailed structure of the control unit 170 is not depicted in the figures, as would be readily understood by those skilled in the art, the control unit 170 may be, e.g., a microprocessor, a microcontroller or the like, that includes a CPU to execute one or more computer instructions to implement the various control operations herein described and/or control operations relating to various components of a photographing apparatus, and to that end may further include a memory device, e.g., a Random Access Memory (RAM), Read-Only-Memory (ROM), a flesh memory, or the like, to store the one or more computer instructions.

In the examples described above, the hand shaking compensation was performed after the focus detection, but such order of operations is only an illustrative example. The focus detection may be performed before and/or after the hand shaking compensation in those embodiments where hand shaking compensation is to be performed in addition to the focus detection.

Moreover, while in the above descriptions for purposes of illustration, both the hand shaking compensation and the auto focus detection are performed using the same AS module 191, other embodiments in which the hand shaking compensation and the focus detection are performed using separate modules. For instance, according to some embodiments, the hand shaking compensation is performed using the AS module 191 while the focus detection is performed using a separate AF module. In such case where a separate AF module is used for the focus detection, while such AF module may implement the driving mechanism, e.g., including a motor, for moving one or more lenses, for example, the fourth lens group of the lens unit as described above, it may not be necessary to provide a separate means such as a separate lens to divide the light to create two images. In addition, it may not be necessary to provide a separate image sensor dedicated for the auto focus detection whereas the focus detection and the photographing of the subject may share the same image sensor.

Further, in the above descriptions, the lenses in the fourth lens group are the ones that are moved perpendicular to the optical axis in order to detect the focus state automatically, but this is only an illustrative example. In other embodiments of the present disclosure, other lens or group of lenses, e.g., the first lens group, the second lens group and the third lens group, may be moved for the detection of the focus state automatically.

In addition, in the above descriptions, while for purposes of illustration the lenses in the second lens group are described as being moved in the direction of the optical axis to bring the subject into focus, in other embodiments any other lens or group lenses, e.g., the first lens group, the third lens group and the fourth lens group, may be moved to adjust the focus on the subject.

It should also be noted that while in the above illustrative descriptions, the entire lens group, i.e., all the lenses belonging to the lens group, are described as being moved for purposes of the focus detection, only one or some lenses in the lens group may be moved according to other embodiments of the present disclosure.

For purposes of convenience of explanation, it has been described that there are the first lens group to the fourth lens group in the lens unit, but such arrangement and organization of the lenses this is only an illustrative example. According to other embodiments, some of the lenses and/or lens groups described above may omitted or some other lens groups may be added.

In the above descriptions, a DSLR camera was taken as an illustrative example of a photographing apparatus according to an embodiment of the present disclosure. However, aspects of the present disclosure may be applicable to other types of photographing apparatus such as, for example, camcorder, a digital camera, a video camera and the like.

According to aspects of the present disclosure, the focus of the subject may be detected without the use of a separate AF module that divides the light, and the focus of the subject may be detected at substantially the same time the subject is photographed.

While the disclosure has been particularly shown and described with reference to several embodiments thereof with particular details, it will be apparent to one of ordinary skill in the art that various changes may be made to these embodiments without departing from the principles and spirit of the invention, the scope of which is defined in the following claims and their equivalents.

What is claimed is:

1. A photographing apparatus, comprising:
an image pickup unit having an imaging surface; and
a control unit configured to cause a movement of at least one lens arranged in the photographic apparatus in a first direction and in a second direction opposite to the first direction, the control unit being further configured to determine a state of focus of a subject being photographed based on a phase difference between a first image, which is generated on the imaging surface of the image pickup unit after the at least one lens has moved in the first direction, and a second image, which is generated on the imaging surface of the image pickup unit after the at least one lens has moved in the second direction, the control unit also being configured to cause movement of a lens group a distance determined according to the state of focus to bring the subject into focus;
wherein the first direction and the second direction are substantially perpendicular to an optical axis of the at least one lens, and wherein the lens group is moved the distance along the optical axis.

2. The photographing apparatus of claim 1, wherein the first direction and the second direction extend diagonally across with respect to the imaging surface of the image pickup unit.

3. The photographing apparatus of claim 1, wherein the control unit is further configured to cause the at least one lens to move in at least one of the first direction and the second direction to thereby compensate for shaking of the photographing apparatus when such shaking is detected after the subject is brought into focus.

4. The photographing apparatus of claim 1, further comprising:
a mirror that allows a portion of light received from the at least one lens to pass therethrough while reflecting the remaining portion of the light,
wherein the portion of the light that has passed through the mirror being incident upon the imaging surface of the image pickup unit to thereby form the first image and the second image on the imaging surface of the image pickup unit.

5. The photographing apparatus of claim 1, wherein the imaging surface comprises a plurality of optical sensors configured to generate an electrical signal corresponding to an image of the subject.

6. The photographing apparatus of claim 1, wherein an optical system of the photographing apparatus includes a plurality of lens groups, and the at least one lens comprises a single lens group from among the plurality of lens groups.

7. A method of determining a focus of a subject, comprising:
moving at least one lens in a first direction to a first position and in a second direction, opposite to the first direction, to a second position;
acquiring a first image formed on an imaging surface when the at least one lens is in the first position and a second image formed on the imaging surface when the at least one lens is in the second position;
determining the focus of the subject based on a phase difference between the first image and the second image; and
moving a lens group a distance determined according to the determined focus to bring the subject into focus;
wherein the first direction and the second direction are substantially perpendicular to an optical axis of the at least one lens, and wherein the lens group is moved the distance along the optical axis.

8. The method of determining the focus as set forth in claim 7, wherein the first direction and the second direction extend diagonally across with respect to the imaging surface.

9. The method of determining the focus as set forth in claim 7, further comprising:
moving the at least one lens in at least one of the first and second directions to compensate for shaking movement of an image acquiring apparatus with which an image of the subject is acquired after the subject is brought into focus.

10. The method of determining the focus as set forth in claim 7, further comprising:
providing a mirror that allows a portion of light received from the at least one lens to pass therethrough while reflecting the remaining portion of the light,
wherein the portion of the light that has passed through the mirror being incident upon the imaging surface of the image pickup unit to thereby form the first image and the second image on the imaging surface.

11. The method of determining the focus as set forth in claim 7, wherein the imaging surface comprises a plurality of optical sensors configured to generate an electrical signal corresponding to an image of the subject.

12. The method of determining the focus as set forth in claim 7, wherein the step of moving at least one lens comprises moving a single lens group from among a plurality of lens groups of an optical system.

13. An apparatus for acquiring an image of a subject, comprising:
an imaging surface arranged in an optical path of light received from the subject such that the light received from the subject is incident upon the imaging surface to thereby form an optical image of the subject on the imaging surface;
an optical system having at least first and second optical elements each arranged in the optical path upstream of the imaging surface, the first optical element being arranged to be moveable in a first direction to a first position and in a second direction to a second position, each of the first and second directions being substantially perpendicular to the optical path such that a first optical image of the subject is formed on a first area of the imaging surface when the first optical element is in the first position, and such that a second optical image of the subject is formed on a second area of the imaging surface different from the first area when the first optical element is in the second position; and
a controller configured to control the optical system to move the second optical element of the optical system along a direction substantially parallel to the optical path by a distance determined based on the first and second optical images of the subject.

14. The apparatus of claim 13, wherein the controller is configured to determine a phase difference between the first and second optical images of the subject and to determined the distance by which to move the second optical element based on the determined phase difference.

15. The apparatus of claim 13, wherein the controller is further configured to control the optical system to cause the first optical element to move in at least one of the first and second directions in response to a detection of a shaking of the apparatus for acquiring the image of the subject.

16. The apparatus of claim 13, further comprising:
a data storage device configured to receive data representative of the image of the subject and to store therein the data, the image of the subject corresponding to the optical image of the subject formed on a third area of the imaging surface different at least in part from each of the first and second areas of the imaging surface.

17. The apparatus of claim 13, further comprising:
a mirror arranged in the optical path between the optical system and the imaging surface, the mirror having a partially reflective surface that allows a portion of light received from the optical system to pass therethrough while reflecting the remaining portion of the light,
wherein a substantially undivided whole of the portion of the light passing through the mirror being incident upon the imaging surface to thereby form the optical image of the subject on the imaging surface.

18. The apparatus of claim 13, wherein the imaging surface defines a substantially a rectangular shaped surface area, and wherein each of the first and second directions extending diagonally across with respect to the imaging surface.

* * * * *